(12) United States Patent
Kerekes et al.

(10) Patent No.: US 6,553,315 B2
(45) Date of Patent: Apr. 22, 2003

(54) SEISMIC IMAGING USING OMNI-AZIMUTH SEISMIC ENERGY SOURCES AND DIRECTIONAL SENSING

(76) Inventors: Albin K. Kerekes, P.O. Box 1118, Bandera, TX (US) 78003; Robert A. Brook, 3527 Orchard Blossom Dr., Sugar Land, TX (US) 77479

( * ) Notice: Subject to any disclaimer, the term of this patent is extended or adjusted under 35 U.S.C. 154(b) by 0 days.

(21) Appl. No.: 10/084,565

(22) Filed: Feb. 27, 2002

(65) Prior Publication Data

US 2002/0128779 A1 Sep. 12, 2002

Related U.S. Application Data

(63) Continuation-in-part of application No. 09/363,584, filed on Jul. 29, 1999, which is a continuation of application No. 08/950,726, filed on Oct. 15, 1997, now Pat. No. 6,023,657.

(51) Int. Cl.$^7$ ................................................ G01V 1/28
(52) U.S. Cl. ........................................... 702/14; 702/6
(58) Field of Search ...................... 702/14, 16; 367/76, 367/57, 72, 15, 56, 36

(56) References Cited

U.S. PATENT DOCUMENTS

| | | | |
|---|---|---|---|
| 2,732,906 A | 1/1956 | Mayne | 181/1.5 |
| 4,403,312 A | 9/1983 | Thomason | 367/56 |
| 4,534,020 A | 8/1985 | O'Brien | 367/188 |
| 4,567,582 A | 1/1986 | Kuhn | 367/56 |
| 4,803,669 A | 2/1989 | Airhart | 367/72 |
| 4,879,695 A | 11/1989 | Meadows | 367/25 |
| 4,903,244 A * | 2/1990 | Alford | 367/36 |
| 4,930,110 A | 5/1990 | Bremner et al. | 367/56 |
| 4,970,696 A * | 11/1990 | Crews et al. | 367/15 |
| 5,080,190 A | 1/1992 | Owen et al. | 181/122 |
| 5,142,500 A * | 8/1992 | Yamamoto et al. | 367/57 |
| 5,406,530 A | 4/1995 | Yamamoto et al. | 367/57 |
| 5,537,364 A | 7/1996 | Howlett | 367/57 |
| 5,627,798 A | 5/1997 | Siems et al. | 367/76 |
| 6,023,657 A * | 2/2000 | Kerekes | 702/14 |

* cited by examiner

*Primary Examiner*—Edward Lefkowitz
*Assistant Examiner*—Victor J. Taylor
(74) *Attorney, Agent, or Firm*—Haynes & Boone, LLP; Todd Mattingly

(57) ABSTRACT

A method and apparatus for surveying a three dimensional sub-surface geological structure having seismic scatterers includes establishing an acquisition system (19) having at least two substantially vertical arrays of sensors (20) disposed within the geological structure. Each array (20) includes multiple directional sensing receivers 30 adapted to receive seismic energy (28, 97) produced from the seismic scatterers (24) in response to at least one seismic disturbance (27). The multiple directional sensing receivers (30) are adapted to provide a measurement of the received seismic energy. A recorder records the measurements of the received seismic energy for producing a complete vector field response of the seismic scatterers to the at least one seismic disturbance. Lastly, a processor processes the complete vector field to generate a three-dimensional image.

54 Claims, 9 Drawing Sheets

SEISMIC IMAGING USING OMNI-AZIMUTH SEISMIC ENERGY SOURCES AND DIRECTIONAL SENSING

This application is a continuation-in-part of copending application U.S. Ser. No. 09/363,584, filed Jul. 29, 1999, entitled "Seismic Imaging Using Omni-Azimuth Seismic Energy Sources and Directional Sensing, which is a continuation of Ser. No. 08/950,726, filed Oct. 15, 1997, entitled "Seismic Imaging Using Omni-Azimuth Seismic Energy Sources and Directional Sensing, now U.S. Pat. No. 6,023,657.

BACKGROUND OF THE INVENTION

This invention relates generally to seismic surveying, and more particularly to three dimensional imaging based upon the use of omni-azimuth seismic energy sources and directional sensing of seismic scatterers.

To investigate a salt dome or like configuration, both a seismic source and seismic receivers or detectors, such as hydrophones, three component geophones, or three component accelerometers, are suspended in a single borehole. Then, seismic signals are sent from the suspended source, such as an airgun, and received by the receivers to define a more accurate map of the salt dome's flank configuration than possible with surface-located seismic sources and detectors.

Presently, three-dimensional (3-D) seismic surveys are based upon recording a vertical component of seismic motion reflected from sub-surface seismic reflectors. The 3-D surveys rely on the measurements of travel time from source to reflector, to receiver, and the geometry of source-receiver positions on the surface. This technique requires an even distribution of seismic energy sources and receivers over the entire surface of the geological field. The seismic data is acquired separately at each receiver and it is processed by corrected summing to create an image of the sub-surface.

What is needed is an apparatus and a method for conducting 3-D seismic surveys using directional sensing rotation within a geological structure's complete vector field that is produced by seismic energy emanating from seismic scatterers in the sub-surface of the geological structure, thereby significantly reducing the need for distribution of seismic energy sources and receivers over the entire surface of the geological structure.

SUMMARY OF THE INVENTION

The present invention, accordingly, provides an apparatus and a method for conducting 3-D seismic surveys using directional sensing rotation within a geological structure's complete vector field. Seismic energy emanating from seismic scatterers in the sub-surface of the geological structure produces sufficient energy for the seismic survey. This technique significantly reduces the need for distribution of seismic energy sources and receivers over the entire surface of the geological structure. To this end, according to one embodiment, an apparatus for providing a three-dimensional seismic image includes an omni-azimuthal source of seismic energy positioned adjacent to a surface of a geological structure. The source emits a signal of sufficient energy and bandwidth to produce seismic energy from a seismic scatterer in the geological structure. A plurality of arrays of sensors are also provided. Each array has directional sensing receivers aligned in the geological structure for receiving and recording measurement of diffracted seismic energy, to produce a complete vector field. The complete vector field is processed to generate the three-dimensional seismic image.

A principal advantage of the present invention is that the sub-surface geological strata is energized ("illuminated") by a seismic energy source. The energization causes elastic discontinuities ("seismic scatterers") to diffract the seismic energy as if they were the source of such seismic energy. The receivers measure all diffractions. A recording unit records all measured diffractions. A processing system processes the recorded information to locate the seismic scatterers, thus creating a three-dimensional image of the sub-surface, which image can be interpreted for geological significance.

DETAILED DESCRIPTION OF THE INVENTION

Figure 1:
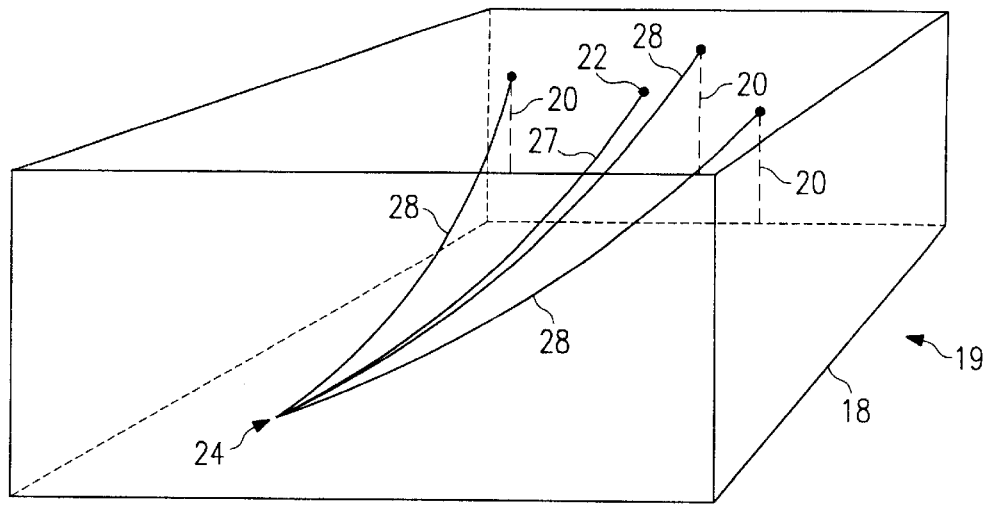
FIG. 1 illustrates a geological structure with a sub-surface seismic scatterer.

Referring to FIG. 1, within a geological structure 18, an acquisition system 19 includes a plurality of directional sensing vertical arrays (DSVA), each designated 20, an omni-azimuthal (i.e. no azimuthal variation) seismic source (OSS) 22 and a seismic scatterer 24. The seismic scatterer 24 is an elastic discontinuity which when energized by a passing seismic wave, acts as a new and independent source of seismic energy. The geological structure 18 is part of a geological field. Although FIG. 1 illustrates only one scatterer 24, the geological structure 18 has multiple seismic scatterers 24. Each DSVA 20 is located at a near-surface distance, typically within 500 feet of a surface of the geological structure 18. The OSS 22 is located on the surface or within the near-surface of the geological structure 18 in a horizontal or vertical arrangement. The OSS 22 has single or multiple elements, having sufficient energy, bandwidth, and beam-angle to adequately energize exploration objectives, such as the geological structure 18. The OSS 22 is either an impulsive source (such as explosives, impactors, and the like), a coherent vibratory source, or a random vibratory source. The OSS 22 is designed to produce seismic energy that is repeatable in order to overcome random ambient noise interferences, as discussed below. The OSS 22 emits a seismic energy 27 at a beginning time. The seismic energy 27 is omni-azimuthal, with sufficient energy and bandwidth to energize geological objectives, such as the geological structure 18. The seismic energy 27 has a signature that is repeatable for a full spectrum of frequencies.

As seismic energy 27 travels through the geological structure 18, it energizes the seismic scatterer 24 and all other seismic scatterers (not shown), located within the geological structure 18. Once energized, the seismic scatterer 24 acts as an independent source of seismic energy and produces a diffracted seismic energy 28, i.e. a seismic energy radiated by an elastic discontinuity that has been energized by a seismic disturbance. The seismic scatterer 24 emits the diffracted seismic energy 28 in all directions. The diffracted seismic energy 28 travels back to each DSVA 20, which measures the diffracted seismic energy 28 as a first arrival measurement for the seismic scatterer 24. A recording unit (not shown) is coupled to each DSVA 20 to record the measured energies. As the diffracted seismic energy 28 travels back to each DSVA 20, the diffracted seismic energy 28, acting as an independent source of seismic energy, energizes secondary seismic scatterers (not shown) surrounding the seismic scatterer 24. The energized secondary seismic scatterers produce secondary diffracted seismic energies that travel back to each DSVA 20. Each DSVA 20 measures and the recording unit records, in addition to the first arrival measurements, secondary diffracted seismic energies produced by the secondary seismic scatterers. Therefore, each DSVA 20 measures a complete vector field. The complete vector field is used to produce a directional measurement and resolution of the geological structure 18 to accurately locate all seismic scatterers 24.

Figure 2:
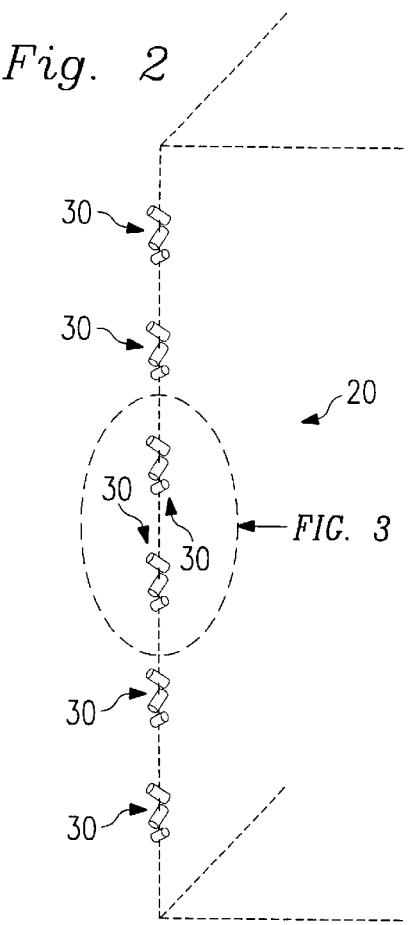
FIG. 2 illustrates a directional sensing vertical array with triphones.
Figure 3:
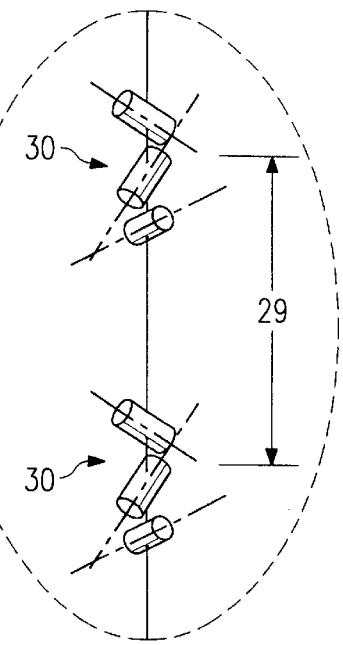
FIG. 3 illustrates a portion of the directional sensing vertical array of FIG. 2 in greater detail.

Referring now to FIG. 2 and FIG. 3, the DSVA 20 includes a plurality of triphones, each designated 30. A triphone is a three-component geophone with identical orthogonal elements, each making an angle of 54 degrees, 35 minutes with the vertical (also called a Gal'perin geophone), which are commercially available from Input/Output, Inc., having a place of business at 11104 West Airport Blvd., Stafford, Tex. 77477-2416, as part number CA 2729. The length of the DSVA 20 equals a longest wavelength component, which is to be measured and recorded, of the diffracted seismic energies produced by the seismic scatterers 24. Increasing the length of the DSVA 20 improves its resolution power. Additionally, a spacing interval 29 separates each triphone 30 from adjacent triphones 30. The user selects the interval 29 to equal half of the shortest wavelength component to be measured and recorded. Shortening the interval 29 enhances resolution of the DSVA 20. The longest and shortest wavelength components are calculated using a compressional-wave (p-wave) velocity of the geological structure 18 surrounding the DSVA 20. The p-wave velocity is a function of the velocity field. If the p-wave velocity is 1500 meters per second, and the desired measurement bandwidth is 10 through 100 Hz, then the DSVA 20 would have twenty of the triphones 30. The interval 29 between adjacent triphones 30 would be 7.5 meters. Thus, the length of the DSVA 20 would be 150 meters.

The user secures each DSVA 20 in position within a borehole using a material of equal or slightly lesser propagation velocity than the formation, which is part of the geological structure 18, surrounding the borehole. The user secures each DSVA 20 in a different borehole. The user surveys each borehole containing the DSVA 20 to determine the borehole's precise coordinates and inclination, to calibrate each DSVA 20. The user calibrates each DSVA 20 using XYZ coordinates, orientation, and interconnecting travel times for each triphone 30 of each DSVA 20 with respect to other triphones 30 in all the other DSVAs 20.

Figure 4:
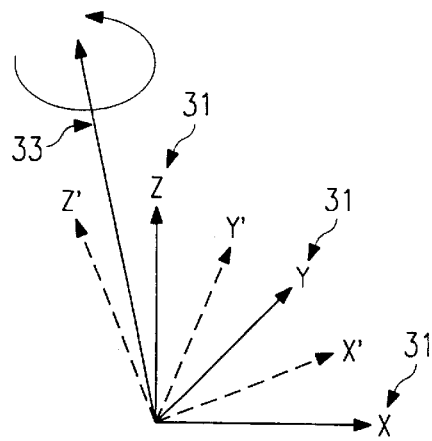
FIG. 4 illustrates a vectorial rotation of the array of FIG. 2, for calibration.

Referring now to FIG. 4, XYZ coordinates 31 are defined by loading each DSVA 20 into the borehole in such a manner that the user measures and records the exact depth of each triphone 30 of each DSVA 20. The user orients each DSVA 20 to a C axis, true North axis 33, using vectorial rotation of data for each triphone 30 in relation to a multi-element up-hole calibration source of known coordinates, conveniently located in the vicinity of each DSVA 20. The user determines the vectorial rotation according to the following equations:

$$c=(c_1, c_2, c_3)=a \times e \quad \text{equation 1(a)}$$

$$\delta = \cos^{-1}(a \cdot e) \quad \text{equation 1(b)}$$

$$A = \cos\delta \begin{pmatrix} 1 & 0 & 0 \\ 0 & 1 & 0 \\ 0 & 0 & 1 \end{pmatrix} + (1-\cos\delta) \times \begin{pmatrix} c_1^2 & c_1 c_2 & c_1 c_3 \\ c_2 c_1 & c_2^2 & c_2 c_3 \\ c_3 c_1 & c_3 c_2 & c_3^2 \end{pmatrix} + \sin\delta \begin{pmatrix} 0 & -c_3 & c_2 \\ c_3 & 0 & -c_1 \\ -c_2 & c_1 & 0 \end{pmatrix} \quad \text{equation 1(c)}$$

$$\begin{pmatrix} X \\ Y \\ Z \end{pmatrix} = A \begin{pmatrix} X' \\ Y' \\ Z' \end{pmatrix} \quad \text{equation 1(d)}$$

where δ is a rotation angle, a is an observed vector, c is an axis of rotation, and e is an emergence vector. From the elements of the up-hole calibration source, the user obtains interconnecting travel times to each triphone 30. The user determines differential travel times based on the relationship between the position of the OSS 22 and depth of each triphone 30. Using the differential travel times, the user generates a velocity field for an area of the geological structure 18 surrounding each DSVA 20. Later, the user uses the velocity field to adjust the diffracted seismic energies 28 along wavefronts traveling through the area of the geological structure 18 surrounding each DSVA 20.

The user selects a layout and a position for each DSVA 20 and the OSS 22 depending on the nature and extent of the exploration objectives. Once the user selects the layout and the position, acquisition of field data can commence. The acquisition involves recording the complete vector field. The OSS 22 generates the seismic energy 27 as illustrated in FIG. 1. Each of the DSVAs 20 measures the diffracted seismic energy 28 for each of the seismic scatterers 24. The recorded information relating to the seismic energy 27 has a real component and an imaginary component, together called a complex trace. The complex trace has attributes that includes information about instantaneous phase, reflection strength representing the envelop of a given wavelet, instantaneous bandwidth, instantaneous polarity, and instantaneous frequency, along with other properties that can be calculated for the complete vector field.

Ambient noises produced during the recording of the complete vector field must be sufficiently attenuated. Ambient noises are random while the seismic energy 27 is repeatable. Accordingly, the diffracted seismic energy 28 is also repeatable. In order to sufficiently attenuate ambient noises, the OSS 22 repeats the seismic energy 27 to record successive complete vector fields and hence successive complex trace attributes. Successive seismic energies 27 are produced until the complex trace attributes of two successive complete vector fields indicate that ambient noises are sufficiently attenuated. For example, a zero instantaneous phase differential of the complex trace attributes of two successive complete vector fields indicates that ambient noises have been sufficiently attenuated.

The complete vector field comprises multiple signals received from multiple directions, with ambient noises sufficiently attenuated. Each triphone 30 measures the diffracted seismic energy 28 from any given direction. Thus, each DSVA 20 can precisely locate the seismic scatterer 24 using a combination of uphole summing, as discussed below, and sensing rotation. Sensing rotation is used because each directional measurement is represented by a three-component orthogonal signal. The three-component orthogonal signal is referenced to the azimuth of the true North axis 33, and also referenced to a declination from the horizontal using the vectorial rotation calibration data established by equations 1(a) through 1(d). The vectorial rotation involves summing the three-component orthogonal signal in such manner that the resulting signal corresponds to the one that would have been received from the direction of the seismic scatterer 24. This is done by summing the three-component orthogonal signal in proportion to the spherical coordinate transform that corresponds to the azimuth and inclination in the direction of the seismic scatterer 24. The process is represented by the equation:

$$\rho = \frac{\frac{X}{\sin\phi\cos\theta} + \frac{Y}{\sin\phi\sin\theta} + \frac{Z}{\cos\phi}}{3} \quad \text{equation (2)}$$

where $\rho$ is the scalar value of the sum, $\theta$ is the azimuth, $\phi$ is the inclination, X is an x-component of the three-component orthogonal signal, Y is a y-component of the three-component orthogonal signal, and Z is a z-component of the three-component orthogonal signal. Thus, the triphone 30 can be focused in any given direction using vectorial rotation, without physical rotation of the triphone 30.

Figure 5:
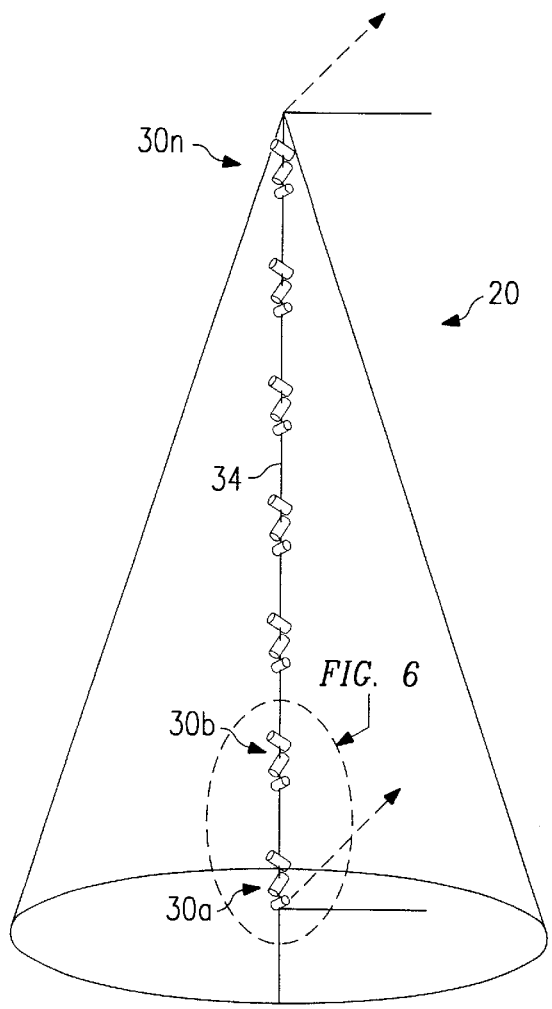
FIG. 5 illustrates uphole summing using one vertical array along a wavefront at a right angle to the vertical.
Figure 6:
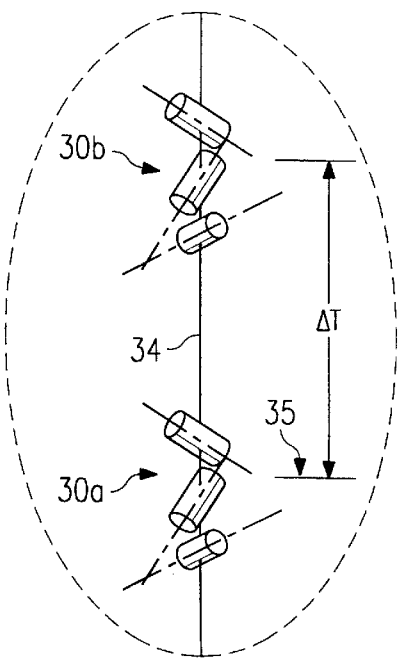
FIG. 6 illustrates a portion of the directional sensing vertical array of FIG. 5 in greater detail.

Referring now to FIG. 5 and FIG. 6, triphones 30*a*, 30*b* and 30$^n$ are part of each DSVA 20. A processing system (not shown) performs uphole summing by taking the diffracted seismic energy 28 received at the triphone 30*a*, the deepest triphone of the DSVA 20, and summing it to the diffracted seismic energy 28 received at the triphone 30*b*, which is immediately above the triphone 30*a*, with an uphole time delay designated $\Delta T$. The processing system repeats the summing process up to, and including, the diffracted seismic energy 28 received at the uppermost triphone 30$^n$. Summing with the delay $\Delta T$ along a vertical axis 34 of the DSVA 20 enhances an emerging wavefront 35 at zero degrees from the vertical axis 34.

Figure 7:
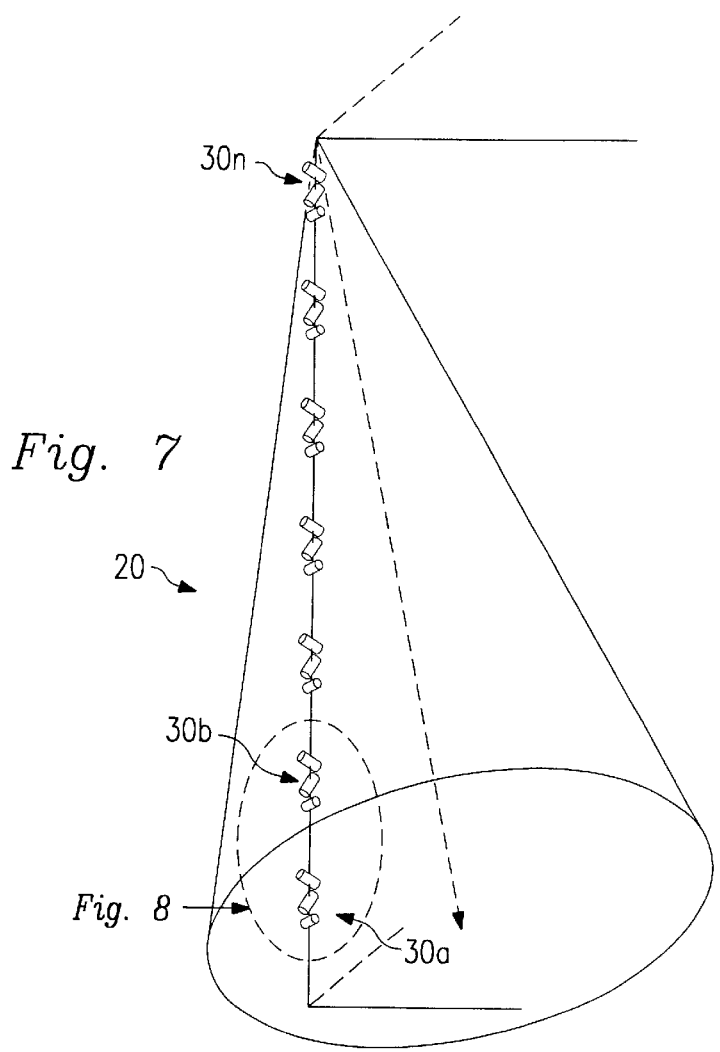
FIG. 7 illustrates uphole summing using one vertical array along a wavefront emerging at an angle $\phi$ to the vertical.
Figure 8:
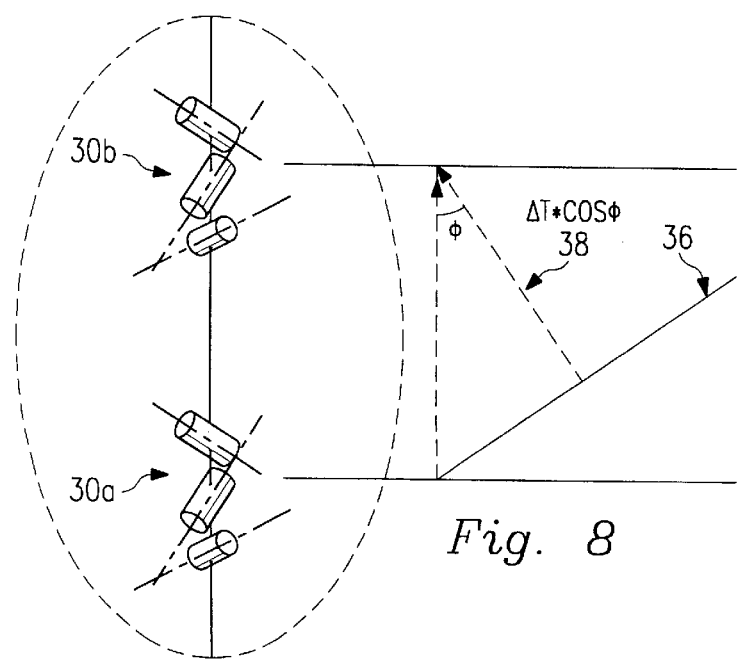
FIG. 8 illustrates a portion of the directional sensing vertical array of FIG. 7 in greater detail.

Referring now to FIG. 7 and FIG. 8, an emerging wavefront 36 travels along an axis 38, at an angle $\phi$ to the vertical axis 34. Uphole summing with an angle uphole delay $\Delta T^*\cos\phi$, along the angle axis 38, enhances the emerging wavefront 36 traveling at the angle $\phi$. Summing with the angle uphole delay $\Delta T^*\cos\phi$, and sensing rotation of the triphones 30*a* through 30$^n$ to any given azimuth and declination, allows the DSVA 20 to focus in a desired direction to isolate the diffracted seismic energies 28 received from the desired direction. Therefore, the DSVA 20 is made highly directional to precisely locate the seismic scatterer 24, using sensing rotation in conjunction with uphole summing.

Figure 9:
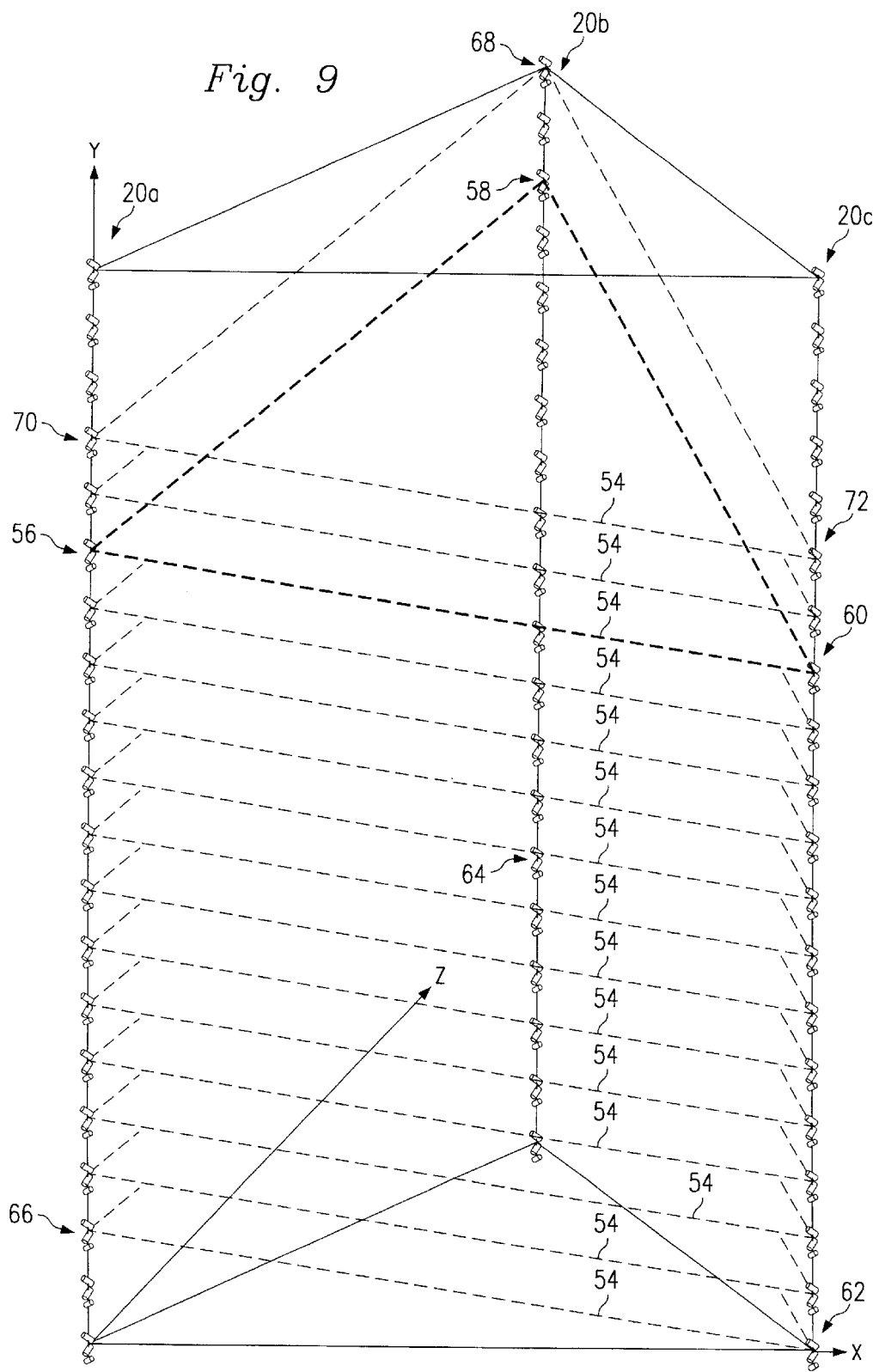
FIG. 9 illustrates the preferred embodiment of the present invention, which uses uphole summing in conjunction with sensing rotation between three vertical arrays along a unique wavefront.

Referring now to FIG. 9, in the preferred embodiment of the present invention, a DSVA 20*a*, a DSVA 20*b*, and a DSVA 20*c* record an emerging wavefront 54, i.e. a wavefront orthogonal to a diffraction direction propagating away from a given seismic scatterer. The DSVA 20*a*, the DSVA 20*b*, and the DSVA 20*c* are shown with identical azimuths and vertical inclinations. Thus, vision lines of the DSVA 20*a*, the DSVA 20*b*, and the DSVA 20*c* are parallel and in unison with proper rotation. As the emerging wavefront 54 cuts across the DSVA 20*a*, the DSVA 20*b*, and the DSVA 20*c* along an emerging azimuth and an emerging declination, the processing system performs uphole summing using corresponding triphones and uphole delays. Uphole summing for the DSVA 20*a* occurs simultaneously to uphole summing for the DSVA 20*b* and the DSVA 20*c*. The processing system uses uphole delays calculated for the emerging azimuth and the emerging declination, based on velocities of the velocity field obtained during the calibration process. Thus, by combining the uphole summing for the DSVA 20*a* with the DSVA 20*b* and the DSVA 20*c*, the processing system enhances information recorded from the emerging azimuth and the emerging declination while attenuating signals from the other directions. For example, a triphone 56, a triphone 58, and a triphone 60 of the DSVA 20*a*, the DSVA 20*b*, and the DSVA 20*c*, respectively receive the wavefront 54. Thus, summing the recorded measurements of the triphones 56, 58, and 60 is the same as uphole summing along one path of the emerging wavefront 54 at an instant in time. At another instant in time, the wavefront 54 reaches a triphone 62, a triphone 64, and a triphone 66. Eventually, the wavefront 54 will propagate through the geological structure 18 to reach a triphone 68, a triphone 70, and a triphone 72. Therefore, starting at the triphone 62, and stopping when summing has reached the triphone 68, a total of fifteen intervals are summed to enhance the diffracted seismic energy associated with the wavefront 54.

Figure 10:
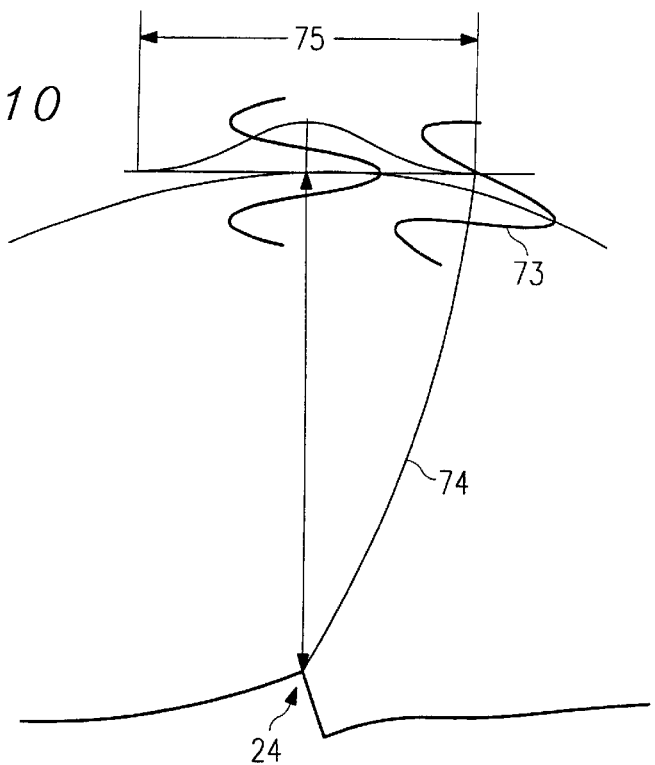
FIG. 10 illustrates bending of a monofrequency wavepath.

Referring now to FIG. 10, monofrequency wave 73 travels along a monofrequency wavepath 74. Monofrequency decomposition of the diffracted seismic energy 28 from the seismic scatterer 24 yields a plurality of Fresnel rings (i.e. a monofrequency response of the diffracted seismic energy from the seismic scatterer) of a certain shape, size, and distribution as measured by the multiple DSVA 20 of FIG. 9. Each Fresnel ring has a first Fresnel zone 75, i.e. the portion of a scatterer from which diffracted energy can reach a detector within one-half wavelength of the first diffracted energy. In general, smaller Fresnel rings correspond to higher frequency components and larger Fresnel rings to lower frequency components. For a given angle of incidence of the monofrequency event, the angle of refraction varies as a function of the wavelength, and thus velocity. Furthermore, variations in the angle of refraction cause bending in wavepaths. Wavepaths differ according to the velocities and time-distance between the seismic scatterer 24 and each DSVA 20. Thus, a velocity function can be derived from analyses of the Fresnel rings as a function of time-distance. The velocity function acts as a velocity model, which comes from the monofrequency decomposition of the Fresnel rings. Accordingly, the velocity function is used to correct the bending and hence accurately locate the position of the seismic scatterer 24.

Figure 11:
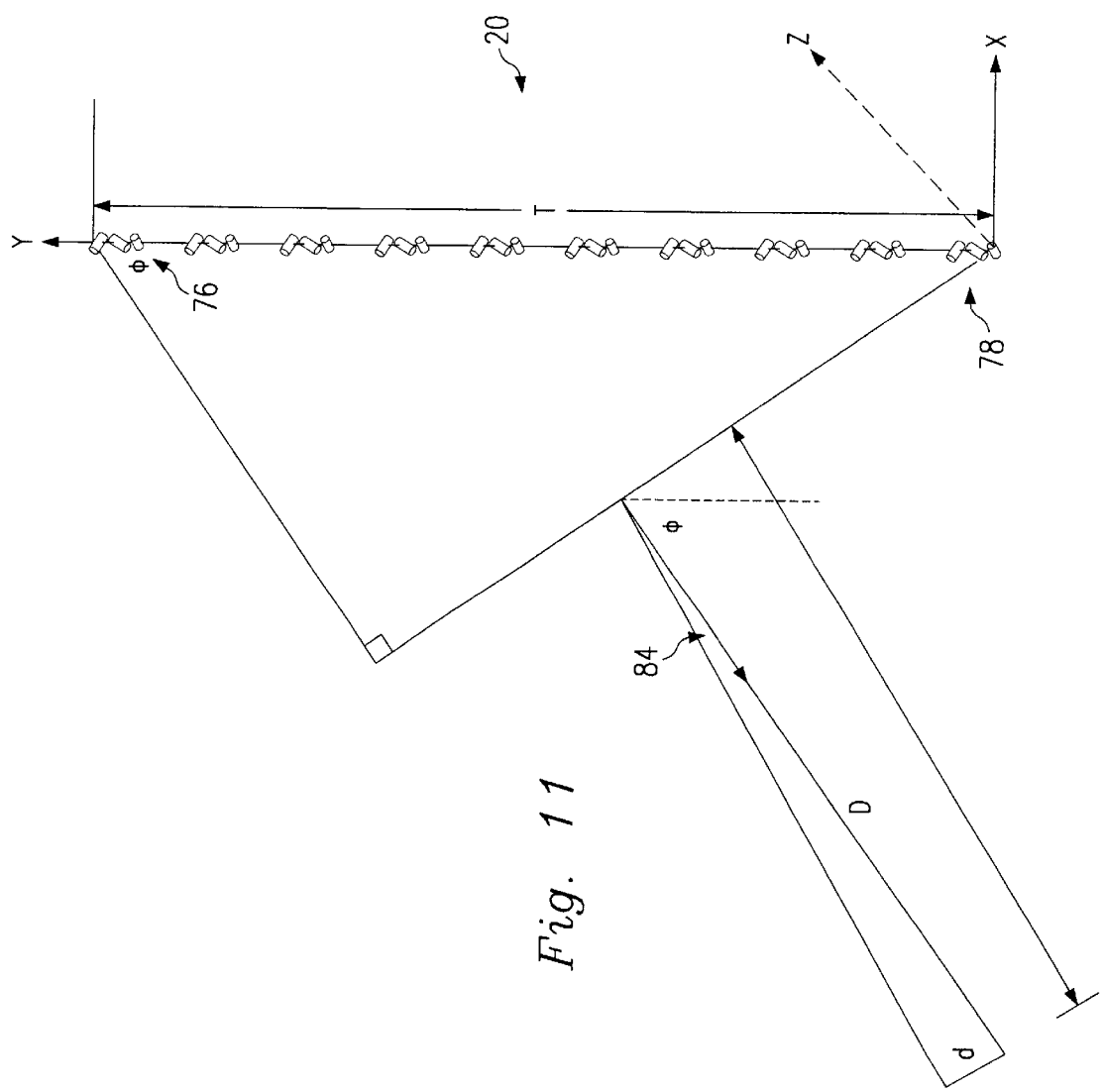
FIG. 11 illustrates the range and resolution power of the vertical array shown in FIG. 1.

Referring now to FIG. 11, the DSVA 20 has a top triphone 76, a bottom triphone 78, a range D, a scanning resolution d, an angular sampling rate 84, and a vision angle $\phi$. The DSVA 20 has a total vertical delay T and a temporal sample rate $\Delta t$. The angular sample rate 84 is defined by the equation:

$$\Delta\Phi = \cos^{-1}\left(\frac{T\cos\Phi - \Delta t}{T}\right) - \Phi \qquad \text{equation (3)}$$

From equation (3), the scanning resolution d of the DSVA 20 can be determined and expressed by the following equation:

$$d = D \tan \Delta\phi \qquad \text{equation (4)}$$

Figure 12:
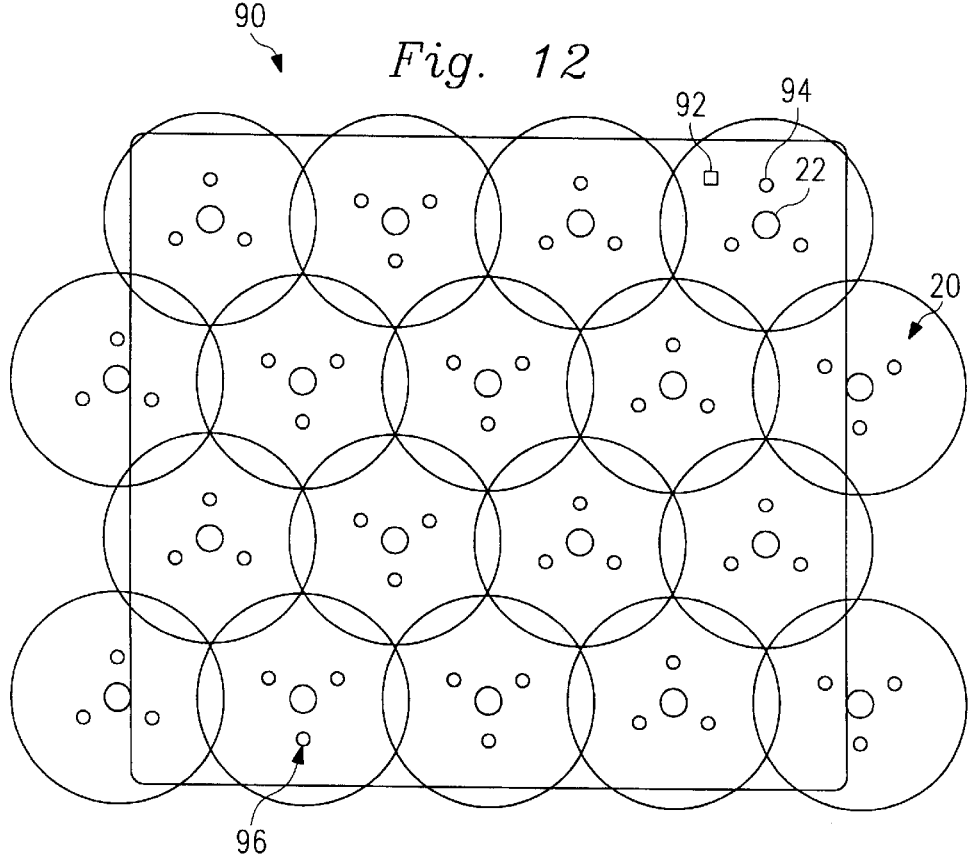
FIG. 12 is an aerial view of a field with omni-azimuthal sources and directional sensing vertical arrays.

In FIG. 12a geological field 90 is illustrated with multiple DSVAs 20 and multiple OSSs 22 for large field exploration. In addition to the features noted above, layout of the field 90 allows collection and correction of near-horizontal data. A path traveled along a near-horizontal plane suffers from bending. If bending occurs, the seismic scatterer appears to be deeper than the seismic scatterer's true position, because velocity generally increases with depth. Thus, near-horizontal data relating to the location of a seismic scatterer 92 shows the seismic scatterer 92 located deeper than its true position. Consequently, the user corrects for bending in the near-horizontal data by warping the velocity field using near-vertical data. Bending of the line of vision is minimum in a vertical direction. Thus, seismic scatterers are located in near true position when using near-vertical data. Accordingly, the near-vertical data relating to the location of the seismic scatterer 92 is the most accurate measurement due to minimum velocity variations with depth in the vertical direction. Thus, the user determines a true position of the seismic scatterer 92 using the near-vertical data measured by a DSVA 94 located substantially above the seismic scatterer 92.

The user compares the true position to a secondary position of the seismic scatterer 92 determined using the near-horizontal data measured by a DSVA 96 located some distance away from the seismic scatterer 92. By comparing, the user determines an error and a correction factor needed to correct the near-horizontal data. The user corrects the near-horizontal data by adjusting to near-vertical data on adjacent and overlapping coverage in the geological field using the correction factor. The correction involves warping a seismic image in space. The amount and distribution of the warping is related to a velocity field causing the bending or distortion. In addition to the warping, a non-zero offset source (not shown) positioning can add valuable information for recording shallow data and defining the velocity field with greater precision.

Figures 13, 14:
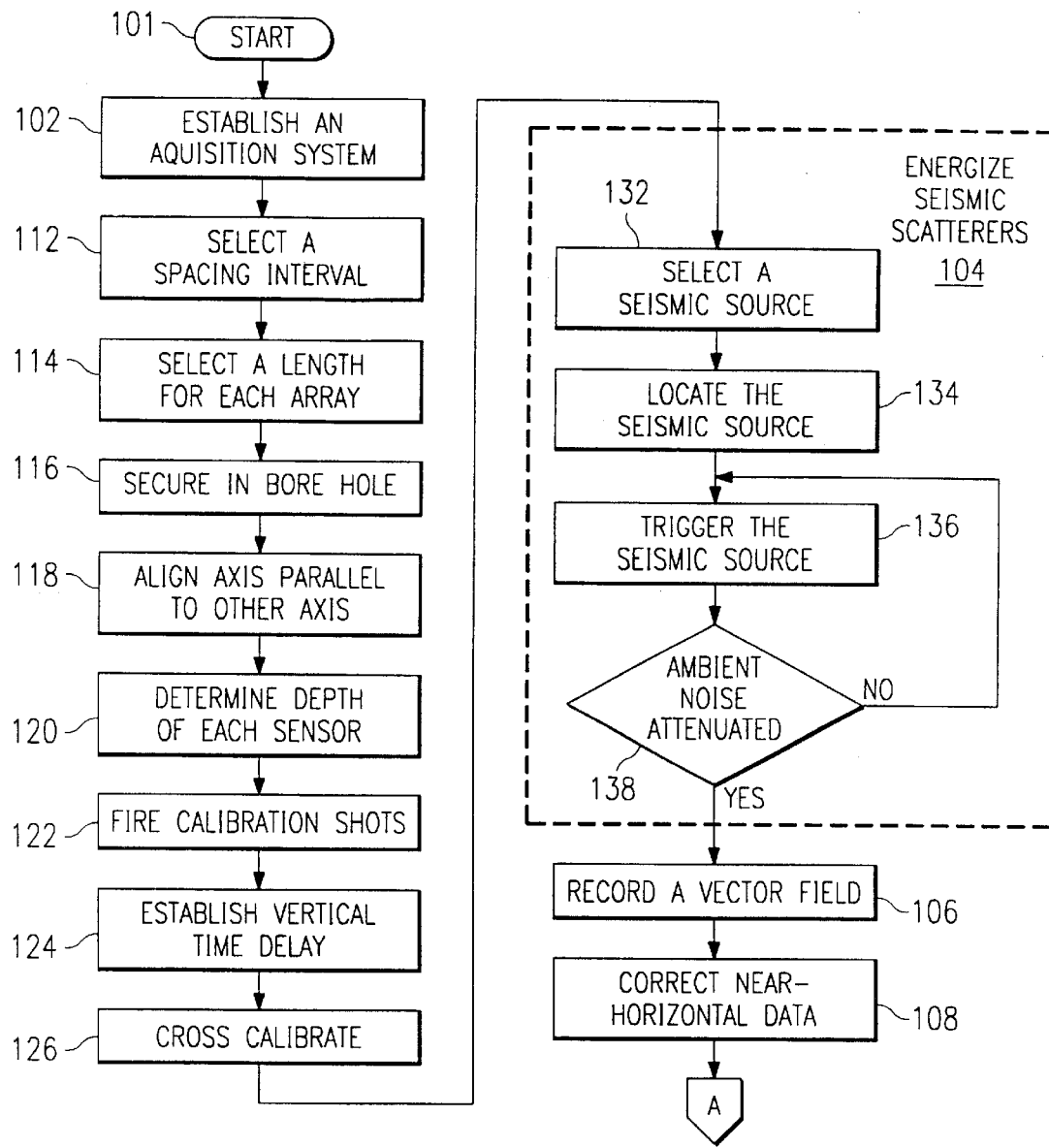
FIG. 13 is a flowchart illustrating the process of establishing a plurality of arrays in a geological structure to measure the response of seismic scatterers to seismic disturbances.
FIG. 14 is a flowchart illustrating the process of sensing rotation and uphole summing to produce a three dimensional seismic image.
Figure 14:
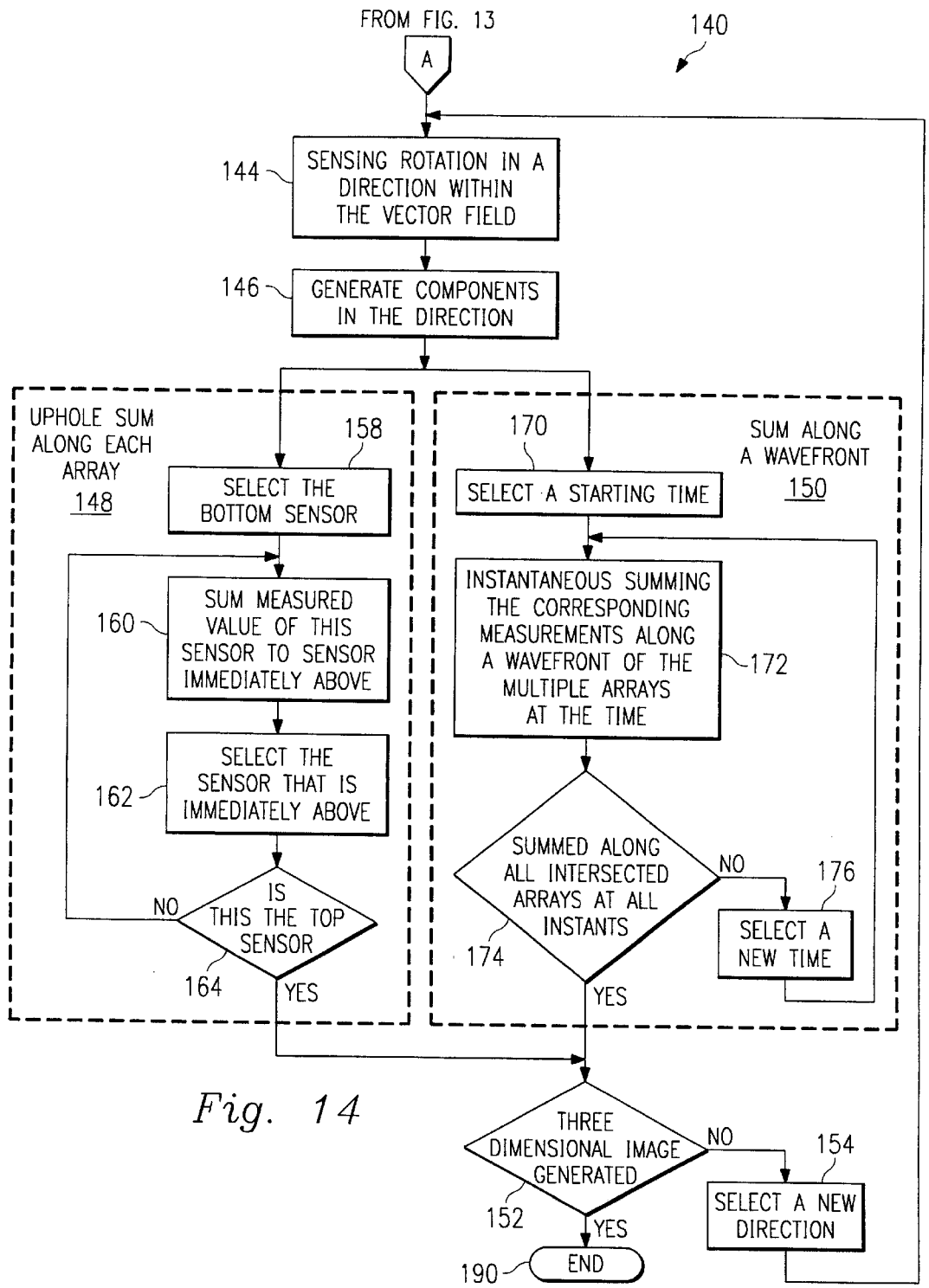

Referring now to FIG. 13, the user begins in step 101. In step 102, the user establishes an acquisition system. Then in step 104, the user triggers the OSS 22 to energize the seismic scatterers 24. In step 106, the recording unit records the response of the seismic scatterers 24 to the seismic energy 27. In step 108, the user corrects near-horizontal data.

In order for the user to establish the acquisition system in step 102, in step 112, the user selects the spacing interval between each of the triphones 30. In step 114, the user also selects the length of each DSVA 20. In step 116, the user secures the DSVA 20 in the borehole. In step 118, the user aligns the axis of the DSVA 20 to other DSVAs 20, so that all of the axes are parallel. In step 120, as the user places each DSVA 20 into the borehole, the user determines the depth of each triphone. In step 122, the user fires calibration shots in the vicinity of each DSVA 20. In step 124, the processing system establishes a time delay based on the response of each DSVA 20 to the calibration shot. In step 126, the processing system cross-calibrates the DSVAs 20.

In step 132, the user selects the OSS 22. In step 134, the user places the OSS 22 at or near the surface of the geological structure 18. In step 136, the user triggers the OSS 22 and the recording unit records the response. In step 138, the user determines whether ambient noises are sufficiently attenuated. If ambient noises are not sufficiently attenuated, then execution returns to step 136 and the user triggers the OSS 22 again. If ambient noises are sufficiently attenuated then the recording unit has recorded the complete vector field in the step 106.

Referring now to FIG. 14 in step 144, the processing system senses rotation. In step 146, the processing system generates components of the measured values in a sensing direction. Depending on the type of processing desired, the processing system performs step 148, step 150, or both sequentially. It is noted that the processing system can perform step 148 and step 150 in any order. In step 148, the processing system uses uphole summing to enhance the resolution of the three dimensional image in the sensing direction. In step 150, the processing system uses uphole summing along a wavefront to enhance sensing along the wavefront. In step 152, the processing system determines whether a three dimensional image has been generated. If more directions must be considered, then in step 154, the processing system selects a new direction, and execution returns to step 144.

In step 158, the processing system selects a recorded measurement of the triphone 30a, (FIG. 5), the bottom sensor, and in step 160, performs uphole summing. In step 162, the processing system selects the recorded measurement of the next highest triphone, and, in step 164, checks to see if the triphone is the highest triphone. If the next highest triphone is not the triphone $30^n$, then the processing system returns to the step 160 to perform uphole summing. If the next highest triphone is the triphone $30^n$, then the processing system goes to step 150 if summing along the wavefront is required. If uphole summing is not required then the processing system goes to step 152 to determine is a three dimensional seismic image is generated.

To sum along the wavefront in step 150, in step 170, the processing system selects a starting time. In step 172, the processing system sums along the wavefront corresponding to a path of the wavefront. In step 174, the processing system determines if the time selected corresponds to a time when the wavefront reaches the top triphone of at least one of the DSVAs 20, which lies in the path of the wavefront. If the top triphone is not reached, then in step 176, another time is selected, and execution returns to step 172. Otherwise, execution returns to step 152, and continues until a three dimensional seismic image is generated, and execution ends at step 190.

Figure 15:
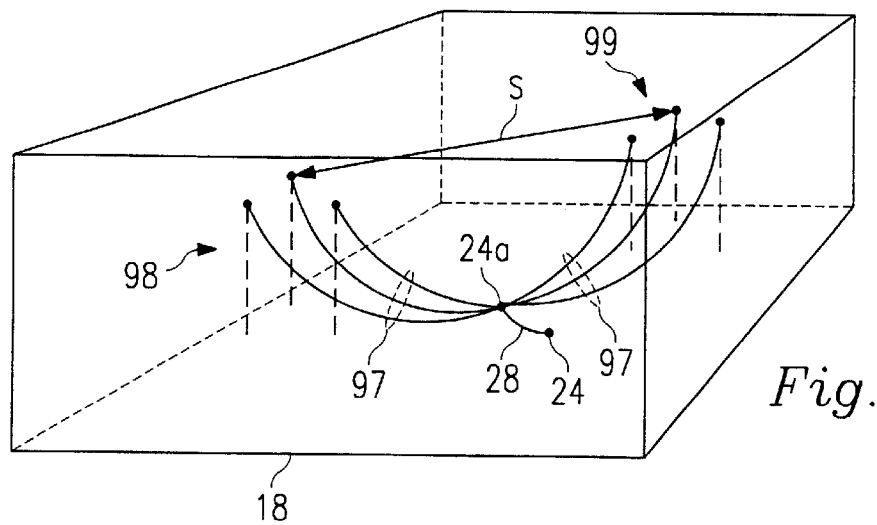
FIG. 15 illustrates triangulation techniques utilizing two directional sensing vertical arrays.

Referring now to FIG. 15, in an alternate embodiment of the present invention, the processing system uses a secondary diffracted seismic energy 97 to locate a secondary seismic scatterer 24a. The diffracted seismic energy 28 re-energizes the secondary seismic scatterer 24a, which occurs a predetermined time period after the initial energization caused by the seismic energy 27. Re-energization continues for some time resulting in multiple energizations (not shown). Accordingly, multiple energizations will occur from multiple directions after the predetermined time period has lapsed. Each DSVA 20 measures the multiple energizations as secondary arrival measurements, after the first arrival measurements.

After the recording unit records the secondary arrival measurements, the processing system locates the seismic scatterers using directional sensing in conjunction with triangulation techniques. The processing system performs triangulation by comparing the secondary arrival measurements measured by at least two selected clusters of DSVAs 98 and 99 separated by a predetermined separation distance S. The separation distance S is preferably in the range of one-half mile up to three miles. Initially the vision lines of each cluster of DSVAs 98 and 99 are parallel to one another. Triangulation is achieved by focusing the vision lines of the cluster of DSVAs 98 and 99, using sensing rotation, so that the vision lines of each cluster moves from the parallel position toward each other, in search of coherency in the complete vector field. The coherency is determined by using some form of a pattern recognition process. Once the coherency is located, then the apparent position of the seismic scatterer 24a, which produced the coherency measured by cluster of DSVAs 98 and 99, can be accurately determined independent of time and velocity.

Figure 16:
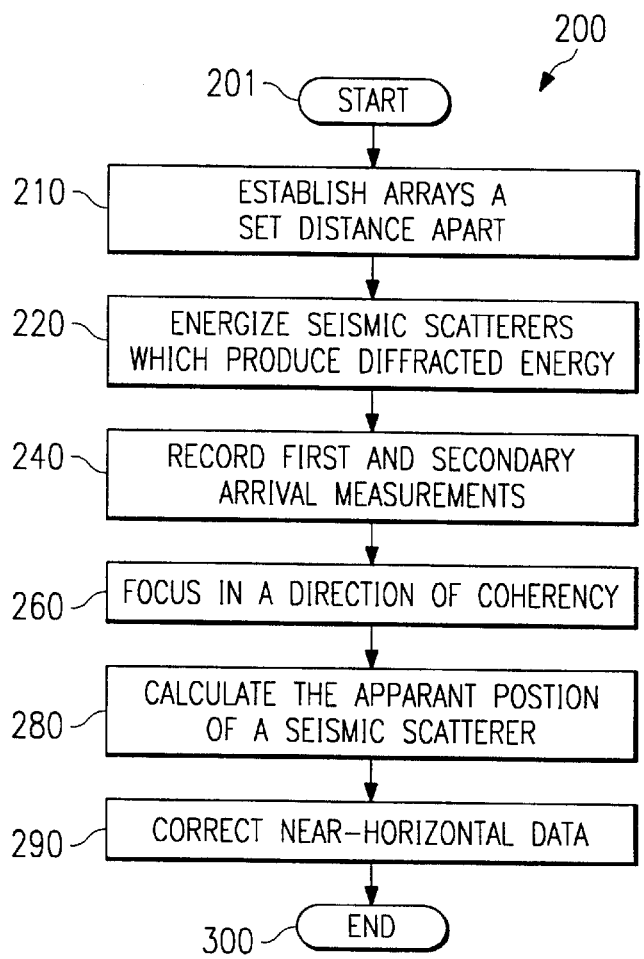
FIG. 16 is a flowchart illustrating the process of sensing rotation and triangulation using secondary arrival measurements.

Referring now to FIG. 16, a flowchart 200 illustrates the process for sensing rotation combined with triangulation using at least two DSVAs 20, which process begins at step 201. In step 210, the user separates the DSVAs 20 by the separation distance S, FIG. 15. In step 220, the user triggers the OSS 22 to energize the seismic scatterers 24 to produce diffracted seismic energy. The diffracted seismic energy re-energizes the seismic scatterer 24a. The re-energized seismic scatterer 24a produces the secondary diffracted seismic energy 97. In step 240, the recording unit records the secondary diffracted seismic energy 97 as the secondary arrival measurement, along with the first arrival measurements. In step 260, the processing system focuses in a direction of a coherency. In step 280, the processing system calculates the apparent position of the seismic scatterer 24a. In step 290, the user corrects near-horizontal data. The user repeats the process set forth in the flowchart 200 until all desired apparent positions of seismic scatterers are determined, and then ends execution in step 300.

In another embodiment of the present invention, a non-repeatable random energy source (NRES) replaces the OSS 22. The user monitors the output of the NRES and records a reliable measurement of the omni-azimuth signature for later correlation.

In yet another embodiment of the present invention the DSVA is replaced by a directional sensing array (DSA) that is substantially vertical. The DSA can deviate up to twenty degrees from the vertical.

In operation, the OSS 22 emits a seismic energy 27 into a geological field. The seismic energy 27 energizes seismic scatterers 24 in the geological field. The energized seismic scatterers 24 act as independent sources of seismic energy and emit diffracted seismic energies 28. Each DSVA 20 measures the diffracted seismic energies 28 as first arrival measurements. As the diffracted seismic energies 28 travel through the geological structure 18, the diffracted seismic energies 28 re-energize other seismic scatterers 24 to produce secondary diffracted seismic energies 97. Each DSVA 20 measures the secondary diffracted seismic energies 97 as secondary arrival measurements. Thus, each DSVA 20 measures a complete vector field. The triphones 30 of the DSVA 20 can be focused in a desired direction using sensing rotation within the complete vector field. Sensing rotation is combined with uphole summing to precisely locate the seismic scatterers 24 in the three dimensional image using time-distance relations of the first arrival measurements. Alternatively, sensing rotation is combined with triangulation techniques to locate the apparent position of the seismic scatterers 24 independent of time, using secondary arrival measurements. On the other hand, sensing rotation and uphole summing can be combined with sensing rotation and triangulation techniques to create the three dimensional seismic image.

According to another embodiment of the present disclosure, an apparatus for providing a three-dimensional seismic image includes an omni-azimuthal source, at least two substantially vertical arrays of sensors, a recorder, and a processor. The omni-azimuthal source of seismic energy is positioned proximate a surface of a geological structure. In response to an activation, the omni-azimuthal source of seismic energy emits a signal of sufficient energy and bandwidth to produce seismic energy from a seismic scatterer in the geological structure. Each array of the at least two substantially vertical arrays of sensors includes multiple directional sensing receivers substantially vertically aligned in the geological structure. The multiple directional sensing receivers receive seismic energy produced from seismic scatterers and are adapted to provide a measurement of the received seismic energy.

The recorder can include any suitable recorder known in the art. The recorder records the measurement of the seismic energy received by the at least two substantially vertical arrays of sensors in response to one or more activations of the omni-azimuthal source. The measurement of seismic energy produces a complete vector field from which to generate the three-dimensional image. In addition, the recorder can be used to record an omni-azimuthal signature of a given geological structure. The omni-azimuthal signature is adapted to correlate seismic energy received by the vertical arrays of sensors in response to seismic energy of interest, for example, seismic energy produced by seismic scatterers in response to non-repeatable random energy sources.

The processor processes the complete vector field to generate the three-dimensional image. The processor can include any suitable processor, computer, or signal processor. Programming of the processor to perform the various functions as discussed and described herein can be accomplished using programming techniques well known in the art.

In addition to processing the complete vector field to generate the three-dimensional image, the processor furthermore separates directional components from a sum of the scattered seismic energy received from scatterers in substantially all directions. For example, separating directional components can include summing signals of the complete vector field along a desired direction defined by an azimuth and declination, for producing a single trace data per sensor, per direction.

Separating directional components can also include summing single trace data from sensors of the substantially vertical arrays, in a manner such that elements of the single trace data being summed at any one time are located on an emerging wavefront of interest. The summing of single trace data on the emerging wavefront of interest is further a function of summing delays derived from calibrated velocities. Accordingly, a single trace data per sensor array, per direction can be produced.

In another embodiment, separating directional components can also include coherency summing. Coherency summing focuses the substantially vertical arrays of sensors on a desired seismic scatterer by pattern recognition. A difference in direction of the desired seismic scatterer, as viewed from the substantially vertical arrays of sensors, is measured as part of a triangulation process from at least two known locations. Using triangulation, an apparent spatial position of the desired seismic scatter can be established.

Separating directional components still further includes measurement of a dispersion velocity between the desired seismic scatterer and one of the vertical arrays of sensors. Measuring the dispersion velocity can be accomplished via monofrequency decomposition of an apparent size and shape of Fresnel rings. The dispersion velocity is adapted to correct the apparent spatial position of the desired seismic scatter.

In yet still another embodiment, the recorder is adapted to record the measurement of seismic energy of a first complete vector field and a second complete vector field. The second complete vector field is representative of a time-lapsed first complete vector field. In this embodiment, the processor processes the first and second complete vector fields to identify a difference between the first complete vector field and the second complete vector field. Such a difference is indicative of a change within the geological structure, for example, a physical change in the sub-surface.

In another embodiment, each of the vertical arrays of sensors includes an array length substantially equal to a length of a longest wavelength component of the seismic energy of interest. The sensors of each array are spaced at intervals substantially equal to one-half of a shortest wavelength component of the seismic energy of interest. The longest and shortest wavelength components of interest are calculated as a function of a desired wave type velocity of the structure surrounding the array.

In yet another embodiment, the processor is further for processing the complete vector field for detecting and defining a type of particle motion with respect to a direction of an elastic wave propagation of seismic energy produced from one or more seismic scatterers within the geological structure. For example, the type of particle motion may include longitudinal, vertically transversal and horizontally transversal waveforms. In another embodiment, the type of particle motion may include other than longitudinal, vertically transversal and horizontally transversal waveforms.

With respect to the embodiment of the previous paragraph, elastic wave types commonly known in the seismic industry today include surface waves and body waves. Surface waves are waves that travel on the surface of a geological sub-surface. Surface waves mainly comprise Love and Raleigh waves, commonly referred to as ground roll. Body waves are waves that travel within the geological sub-surface. Body waves include longitudinal, transversal horizontal, and transversal vertical. Body waves are of particular interest, whereas, surface waves are of less particular interest.

Longitudinal (Pressure or p-wave) waves include particle motion that is in the direction of the wave propagation. Transversal horizontal (Shear or SH-wave) waves include particle motion that is horizontally perpendicular to the direction of the wave propagation. Transversal vertical (Shear or SV-wave) waves include particle motion that is vertically perpendicular to the direction of the wave propagation. The embodiments of the present disclosure enable detection of the above types of particle motion with respect to the direction of the elastic wave propagation. The embodiments of the present disclosure also enable a detecting and defining of any and all types of particle motion with respect to the direction of the elastic wave propagation that is beyond the currently defined longitudinal, vertically transversal and horizontally transversal waveforms.

According to yet another embodiment, an apparatus is provided for measuring a response of sub-surface seismic scatterers in a geological structure to at least one seismic disturbance. The apparatus includes two or more substantially vertical arrays of sensors, a recorder, and a processor. Each array includes multiple directional sensing receivers substantially vertically aligned in the geological structure. The multiple directional sensing receivers are adapted to receive seismic energy produced from seismic scatterers in response to a seismic disturbance. The multiple directional sensing receivers further are adapted to provide a measurement of the received seismic energy. In this embodiment, the recorder records a measurement of the seismic energy received by the substantially vertical arrays of sensors, wherein the measurement of seismic energy produces a complete vector field. Subsequently, the processor generates a three-dimensional image from the complete vector field of measured seismic energy.

The embodiment can also include an omni-azimuthal source of seismic energy for providing at least one seismic disturbance. In such an instance, the omni-azimuthal source is positioned proximate a surface of the geological structure for providing the seismic disturbance. Upon an activation, the omni-azimuthal source emits a signal of sufficient energy and bandwidth to produce seismic energy from the seismic scatterers in the geological structure. The recorder records the measurement of the seismic energy received by the substantially vertical arrays of sensors in response to the activation of the omni-azimuthal source.

The at least one seismic disturbance may further include one produced from a source other than the omni-azimuthal source. For example, the other source might include physical changes in the sub-surface. In such an instance, the recorder records seismic energy received by the substantially vertical arrays of sensors from seismic energy produced by the seismic scatterers in response to the source (other than the omni-azimuthal source). In addition, the recorder further records at least one omni-azimuthal signature, wherein the omni-azimuthal signature is adapted for correlation with measurements of seismic energy produced in response to the other source.

Accordingly, the embodiments of the present disclosure include passive monitoring of background seismic radiation emanating from geologic objectives. Passive monitoring can be accomplished using the directional sensing and processing methodology embodiments of the present disclosure. With passive monitoring, seismic energy is generated as a result of physical changes in the sub-surface.

Seismic disturbances can be created in the sub-surface by a variety of means. One example would be the result of producing hydrocarbons from a sub-surface reservoir. Fluid flow through a reservoir creates micro-fracturing that propagates seismic waves to the surface. Monitoring of the energy emissions would allow detection of fluid fronts, such as oil, water or gas moving through the reservoir. Information obtained via the directional sensing and processing methodology of the embodiments of the present disclosure can be advantageously used for optimizing secondary recovery techniques, such as water or $CO_2$ injection.

Another example of seismic disturbance would be the seismic emissions generated from a well bore operation, such as fracture stimulation. In this instance, sand is forced into the reservoir under pressure to create fractures that enhance the ultimate oil and gas recovery from a given well bore. Using information obtained via the directional sensing and processing methodology of the embodiments of the present disclosure, imaging of the extent of penetration of the sand into the reservoir is possible. Accordingly, the imaging information enables a petroleum engineer to more readily optimize parameters for future stimulation operations.

Accordingly, passive monitoring applications utilize the various embodiments of the directional sensing vertical arrays, measurement techniques, and processing techniques as discussed herein. For passive monitoring, the seismic source (OSS) includes a source resulting from a disturbance in the sub-surface. The seismic scatterer would be at the point of the seismic source. The one or more DVSA records over a period of time, and data is processed accordingly, as discussed herein. Comparison of multiple recordings from different chronological periods provides for detection of changes in a reservoir relating to the production or stimulation techniques discussed above.

The principle advantages of the present invention include the ability to measure and record a complete vector field; imaging seismic scatterers rather than just locating reflections; measuring direction vectors; requiring only partial surface coverage rather than 100% coverage; uphole summing of the data rather than individually acquiring data; and directional separation during processing. A geological survey of a geological structure can be accurately produced and the location of sub-surface elastic boundaries or seismic scatterers can be precisely determined. Less labor is needed, which reduces cost and increases security. Less channels are needed, and fewer source positions are required, to produce continuous coverage of the geological structure. Turnaround time for field acquisition data is reduced significantly. Higher resolution and an improved signal-to-noise ratio is achieved.

Although illustrative embodiments have been shown and described, a wide range of modifications, changes and substitutions is contemplated in the foregoing disclosure. In some instances, some features of the embodiments may be employed without a corresponding use of other features. Accordingly, it is appropriate that the appended claims be construed broadly and in a manner consistent with the scope of the embodiments disclosed herein.

What is claimed is:

1. Apparatus for providing a three-dimensional seismic image comprising:
   an omni-azimuthal source of seismic energy positioned proximate a surface of a geological structure for emitting a signal of sufficient energy and bandwidth to produce seismic energy from a seismic scatterer in the geological structure;
   at least two substantially vertical arrays of sensors, each array including multiple directional sensing receivers substantially vertically aligned in the geological structure for receiving the seismic energy produced from the seismic scatterer and adapted to provide a measurement of the received seismic energy; and
   a recorder for recording the measurement of the seismic energy received by said at least two substantially vertical arrays of sensors in response to at least one activation of said omni-azimuthal source, the measurement of seismic energy producing a complete vector field from which to generate the three-dimensional image.

2. The apparatus of claim 1, wherein said recorder further records an omni-azimuthal signature adapted to correlate seismic energy received by said at least two substantially vertical arrays of sensors in response to a non-repeatable random energy source producing seismic energy from the seismic scatterer.

3. The apparatus of claim 1, further comprising:
   a processor for processing the complete vector field to generate the three-dimensional image.

4. The apparatus of claim 3, wherein said processor is further for separating directional components from a sum of the scattered seismic energy received from scatterers in substantially all directions.

5. The apparatus of claim 4, wherein separating directional components includes summing signals of the complete vector field along a desired direction defined by an azimuth and declination, for producing a single trace data per sensor, per direction.

6. The apparatus of claim 5, wherein separating directional components further includes summing single trace data from sensors of said at least two substantially vertical arrays, in a manner such that elements of the single trace data being summed at any one time are located on an emerging wavefront of interest as a function of summing delays derived from calibrated velocities, for producing a single trace data per sensor array, per direction.

7. The apparatus of claim 4, wherein separating directional components includes coherency summing, coherency summing adapted to focus the at least two substantially vertical arrays of sensors on a desired seismic scatterer by pattern recognition, further wherein a difference in direction of the desired seismic scatterer as viewed from the at least two substantially vertical arrays of sensors is measured as part of a triangulation process from at least two known locations, for establishing an apparent spatial position of the desired seismic scatter.

8. The apparatus of claim 7, wherein separating directional components includes measurement of a dispersion velocity between the desired seismic scatterer and one of said at least two substantially vertical arrays of sensors by monofrequency decomposition of an apparent size and shape of Fresnel rings, the dispersion velocity adapted to correct the apparent spatial position of the desired seismic scatter.

9. The apparatus of claim 3, wherein said processor is further for separating directional components, from a sum of the scattered seismic energy received from scatterers in substantially all directions, by summing components along a desired direction defined by an azimuth and declination, between a distal sensor and a proximate sensor of said at least two substantially vertical arrays of sensors.

10. The apparatus of claim 3, wherein said processor is further for summing directional components of the recorded signals from successive ones of the sensors of said at least two substantially vertical arrays along a wavefront traveling in a desired direction, the direction defined by an azimuth and declination.

11. The apparatus of claim 3, further wherein said recorder is adapted to record the measurement of seismic energy of a first complete vector field and a second complete vector field, the second complete vector field representative of a time-lapsed first complete vector field, and wherein said processor is further for processing the first and second complete vector fields to identify a difference between the first complete vector field and the second complete vector field, the difference being indicative of a change within the geological structure.

12. The apparatus of claim 1, wherein said omni-azimuthal seismic energy source includes at least one selected from an impulsive energy source and a vibratory energy source.

13. The apparatus of claim 1, wherein each directional sensing receiver of said at least two substantially vertical arrays of sensors is adapted to receive energy constituting a sum of scattered seismic energy from scatterers in substantially all directions.

14. The apparatus of claim 1, wherein the directional sensing receivers of said at least two substantially vertical arrays of sensors include triphones.

15. The apparatus of claim 14, further comprising a material for securing the triphones within the geological structure, the material having a substantially similar velocity as that of a surrounding structure at the location of a respective triphone within the geological structure.

16. The apparatus of claim 1, wherein each array of said at least two substantantially vertical arrays of sensors includes an array length substantially equal to a length of a longest wavelength component of the seismic energy of interest, and the sensors of each array are spaced at intervals substantially equal to one-half of a shortest wavelength component of the seismic energy of interest.

17. The apparatus of claim 16, wherein the longest and shortest wavelength components of interest are calculated as a function of a desired wave type velocity of the structure surrounding the array.

18. The apparatus of claim 3, wherein said processor is further for processing the complete vector field for detecting and defining a type of particle motion with respect to a direction of an elastic wave propagation of seismic energy produced from the seismic scatterer.

19. The apparatus of claim 18, wherein the type of particle motion includes longitudinal, vertically transversal and horizontally transversal waveforms.

20. The apparatus of claim 18, wherein the type of particle motion includes other than longitudinal, vertically transversal and horizontally transversal waveforms.

21. An apparatus for measuring a response of a sub-surface seismic scatterer in a geological structure to at least one seismic disturbance, the apparatus comprising:
at least two substantially vertical arrays of sensors, each array including multiple directional sensing receivers substantially vertically aligned in the geological structure, the multiple directional sensing receivers adapted to receive the seismic energy produced from the seismic scatterer in response to the at least one seismic disturbance, the multiple directional sensing receivers further being adapted to provide a measurement of the received seismic energy; and
a recorder for recording the measurement of the seismic energy received by said at least two substantially vertical arrays of sensors, the measurement of seismic energy suitable for use in producing a complete vector field for generation of a three-dimensional image.

22. The apparatus of claim 21, further comprising:
an omni-azimuthal source of seismic energy positioned proximate a surface of the geological structure for providing the at least one seismic disturbance, said omni-azimuthal source emitting a signal of sufficient energy and bandwidth to produce seismic energy from the seismic scatterer in the geological structure, wherein said recorder records the measurement of the seismic energy received by said at least two substantially vertical arrays of sensors in response to at least one activation of said omni-azimuthal source.

23. The apparatus of claim 22, wherein the at least one seismic disturbance further includes one from a source other than said omni-azimuthal source of energy.

24. The apparatus of claim 23, wherein the source other than said omni-azimuthal source of energy includes physical changes in the sub-surface.

25. The apparatus of claim 23, wherein said recorder further records at least one omni-azimuthal signature, the omni-azimuthal signature being adapted to correlate seismic energy received by said at least two substantially vertical arrays of sensors from seismic energy produced by the seismic scatterer in response to the source other than said omni-azimuthal source of energy.

26. The apparatus of claim 23, further comprising:
a processor for processing the complete vector field to generate the three-dimensional image.

27. The apparatus of claim 26, further wherein said recorder is adapted to record the measurement of seismic energy of a first complete vector field and a second complete vector field, the second complete vector field representative of a time-lapsed first complete vector field, and wherein said processor is further for processing the first and second complete vector fields to identify a difference between the first complete vector field and the second complete vector field, the difference being indicative of a sub-surface change within the geological structure.

28. The apparatus of claim 26, wherein said processor is further for separating directional components from a sum of the scattered seismic energy received from scatterers in substantially all directions.

29. The apparatus of claim 28, wherein separating directional components includes summing signals of the complete vector field along a desired direction defined by an azimuth and declination, for producing a single trace data per sensor, per direction.

30. The apparatus of claim 29, wherein separating directional components further includes summing single trace data from sensors of said at least two substantially vertical arrays, in a manner such that elements of the single trace data being summed at any one time are located on an emerging wavefront of interest as a function of summing delays derived from calibrated velocities, for producing a single trace data per sensor array, per direction.

31. The apparatus of claim 28, wherein separating directional components includes coherency summing, coherency summing adapted to focus the at least two substantially vertical arrays of sensors on a desired seismic scatterer by pattern recognition, further wherein a difference in direction of the desired seismic scatterer as viewed from the at least two substantially vertical arrays of sensors is measured as part of a triangulation process from at least two known locations, for establishing an apparent spatial position of the desired seismic scatter.

32. The apparatus of claim 28, wherein separating directional components includes measurement of a dispersion velocity between a desired seismic scatterer and one of said at least two substantially vertical arrays of sensors by monofrequency decomposition of an apparent size and shape of Fresnel rings, the dispersion velocity adapted to correct the apparent spatial position of the desired seismic scatter.

33. The apparatus of claim 26, wherein said processor is further for separating directional components, from a sum of the scattered seismic energy received from scatterers in substantially all directions, by summing components along a desired direction defined by an azimuth and declination, between a distal sensor and a proximate sensor of said at least two substantially vertical arrays of sensors.

34. The apparatus of claim 26, wherein said processor is further for summing directional components of the recorded signals from successive ones of the sensors of said at least two substantially vertical arrays along a wavefront traveling in a desired direction, the direction defined by an azimuth and declination.

35. The apparatus of claim 26, wherein said processor is further for processing the complete vector field for detecting and defining a type of particle motion with respect to a direction of an elastic wave propagation of seismic energy produced from a desired scatterer.

36. The apparatus of claim 35, wherein the type of particle motion includes longitudinal, vertically transversal and horizontally transversal waveforms.

37. The apparatus of claim 35, wherein the type of particle motion includes other than longitudinal, vertically transversal and horizontally transversal waveforms.

38. A method for surveying a three dimensional sub-surface geological structure having seismic scatterers, the method comprising:

establishing an acquisition system having at least two substantially vertical arrays of sensors disposed within the geological structure, wherein each array includes multiple directional sensing receivers adapted to receive seismic energy produced from the seismic scatterers in response to at least one seismic disturbance, the multiple directional sensing receivers further being adapted to provide a measurement of the received seismic energy; and recording the measurement of the received seismic energy and producing a complete vector field response of the seismic scatterers to the at least one seismic disturbance.

39. The method of claim 38, further comprising:

positioning an omni-azimuthal source of seismic energy proximate a surface of the geological structure for providing the at least one seismic disturbance, the omni-azimuthal source emitting a signal of sufficient energy and bandwidth to produce seismic energy from the seismic scatterers in response to the at least one seismic disturbance, wherein recording the measurement further includes recording the measurement of the seismic energy received by the at least two substantially vertical arrays of sensors in response to at least one activation of the omni-azimuthal source.

40. The method of claim 39, wherein the at least one seismic disturbance further includes one from a source other than the omni-azimuthal source of energy.

41. The method of claim 40, wherein the source other than the omni-azimuthal source of energy includes physical changes in the sub-surface.

42. The method of claim 40, wherein recording further includes recording at least one omni-azimuthal signature, the omni-azimuthal signature being adapted to correlate seismic energy received by the at least two substantially vertical arrays of sensors from seismic energy produced by the seismic scatterer in response to the source other than the omni-azimuthal source of energy.

43. The method of claim 40, further comprising:

processing the complete vector field to generate a three-dimensional image.

44. The method of claim 43, wherein recording further includes recording the measurement of seismic energy of a first complete vector field and a second complete vector field, the second complete vector field representative of a time-lapsed first complete vector field, and wherein processing further includes processing the first and second complete vector fields to identify a difference between the first complete vector field and the second complete vector field, the difference being indicative of a sub-surface change within the geological structure.

45. The method of claim 43, wherein processing further includes separating directional components from a sum of the scattered seismic energy received from scatterers in substantially all directions.

46. The method of claim 45, wherein separating directional components includes summing signals of the complete vector field along a desired direction defined by an azimuth and declination, for producing a single trace data per sensor, per direction.

47. The method of claim 46, wherein separating directional components further includes summing single trace data from all sensors of said at least two substantially vertical arrays, in a manner such that elements of the single trace data being summed at any one time are located on an emerging wavefront of interest as a function of summing delays derived from calibrated velocities, for producing a single trace data per sensor array, per direction.

48. The method of claim 45, wherein separating directional components includes coherency summing, coherency summing adapted to focus the at least two substantially vertical arrays of sensors on a desired seismic scatterer by pattern recognition, further wherein a difference in direction of the desired seismic scatterer as viewed from the at least two substantially vertical arrays of sensors is measured as part of a triangulation process from at least two known locations, for establishing an apparent spatial position of the desired seismic scatter.

49. The method of claim 48, wherein separating directional components includes measurement of a dispersion velocity between a desired seismic scatterer and one of the at least two substantially vertical arrays of sensors by monofrequency decomposition of an apparent size and shape of Fresnel rings, the dispersion velocity adapted to correct the apparent spatial position of the desired seismic scatter.

50. The method of claim 41, wherein processing further includes separating directional components, from a sum of the scattered seismic energy received from scatterers in substantially all directions, by summing components along a desired direction defined by an azimuth and declination, between a distal sensor and a proximate sensor of the at least two substantially vertical arrays of sensors.

51. The method of claim 41, wherein processing further includes summing directional components of the recorded signals from successive ones of the sensors of the at least two substantially vertical arrays along a wavefront traveling in a desired direction, the direction defined by an azimuth and declination.

52. The method of claim 41, wherein processing further includes processing the complete vector field for detecting and defining a type of particle motion with respect to a direction of an elastic wave propagation of seismic energy produced from a desired scatterer.

53. The method of claim 52, wherein the type of particle motion includes longitudinal, vertically transversal and horizontally transversal waveforms.

54. The method of claim 52, wherein the type of particle motion includes other than longitudinal, vertically transversal and horizontally transversal waveforms.

* * * * *